(12) United States Patent
Yamamoto et al.

(10) Patent No.: US 7,851,955 B2
(45) Date of Patent: Dec. 14, 2010

(54) COIL CONNECTING STRUCTURE, COIL CONNECTING METHOD, SET OF CONDUCTORS, AND ELECTRIC MOTOR

(75) Inventors: Tomonaga Yamamoto, Yamanashi (JP); Hidetoshi Uematsu, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 162 days.

(21) Appl. No.: 12/081,944

(22) Filed: Apr. 23, 2008

(65) Prior Publication Data
US 2008/0290978 A1    Nov. 27, 2008

(30) Foreign Application Priority Data
May 24, 2007    (JP)    ............... 2007-138322

(51) Int. Cl.
  *H02K 11/00*    (2006.01)
  *H02K 3/46*    (2006.01)
  *H02K 3/48*    (2006.01)
  *H02K 15/00*    (2006.01)
  *H02B 1/20*    (2006.01)
  *H01F 7/06*    (2006.01)
  *H01F 27/29*    (2006.01)
  *H01H 11/00*    (2006.01)
  *H01R 43/00*    (2006.01)

(52) U.S. Cl. .................. 310/71; 310/260; 310/214; 361/637; 29/606; 29/622; 29/596; 29/825; 336/192

(58) Field of Classification Search .............. None
See application file for complete search history.

(56) References Cited

U.S. PATENT DOCUMENTS 3,725,707 A * 4/1973 Leimbach et al. ............ 310/71

| 6,924,570 | B2 * | 8/2005 | De Filippis et al. | ........... 310/71 |
| 6,993,829 | B2 * | 2/2006 | Kobayashi et al. | ............ 29/622 |
| 7,518,853 | B2 * | 4/2009 | Kato et al. | ................... 361/637 |

(Continued)

FOREIGN PATENT DOCUMENTS

CN    1414674    4/2003

(Continued)

OTHER PUBLICATIONS

European Search Report mailed Sep. 26, 2008 issued in European Application No. 08155441.2.

(Continued)

*Primary Examiner*—Elvin G Enad
*Assistant Examiner*—Mangtin Lian
(74) *Attorney, Agent, or Firm*—Drinker Biddle & Reath LLP

(57) ABSTRACT

An electric motor that does not provide new terminals for carrying out conductive caulking, and further, facilitates the work of using a conductive caulking machine. An electric motor coil connecting structure that connects conductors connected to a power input member and lead terminals of coils by conductive caulking and connects the power input member and the lead terminals of the coil electrically. One end of each of the conductors is formed into a terminal-shaped portion in which the lead terminals of the coil can be fitted and temporarily retained. The lead terminals of the coil are fitted in the terminal-shaped portion of the conductors and temporarily retained, and connected by conductive caulking.

6 Claims, 8 Drawing Sheets

U.S. PATENT DOCUMENTS

| | | | |
|---|---|---|---|
| 7,626,294 B2 * | 12/2009 | Ohta et al. | 310/71 |
| 2003/0090166 A1 | 5/2003 | Kobayashi et al. | |
| 2003/0173842 A1 * | 9/2003 | Kobayashi et al. | 310/71 |
| 2004/0150280 A1 * | 8/2004 | Moroto et al. | 310/154.28 |
| 2005/0231050 A1 * | 10/2005 | Sasaki et al. | 310/71 |
| 2006/0138883 A1 * | 6/2006 | Yagai et al. | 310/71 |
| 2007/0076354 A1 * | 4/2007 | Kato et al. | 361/637 |
| 2007/0080592 A1 | 4/2007 | Ohta et al. | |
| 2009/0039720 A1 * | 2/2009 | Tsukashima et al. | 310/71 |

FOREIGN PATENT DOCUMENTS

| | | |
|---|---|---|
| CN | 1953297 | 4/2007 |
| JP | 10-32954 | 2/1998 |
| JP | 11-18345 | 1/1999 |
| JP | 2001-231210 | 8/2001 |
| JP | 2002-343528 | 11/2002 |
| JP | 2002-153003 | 5/2004 |
| JP | 2004-343831 | 12/2004 |
| JP | 2006-31986 | 2/2006 |
| JP | 2006-238641 | 9/2006 |

OTHER PUBLICATIONS

Japanese Notice of Reasons for Rejection mailed Oct. 28, 2008 issued in Japanese Application No. 2007-138322 (including a partial translation thereof).

Notification of First Office Action dated Apr. 14, 2010 that issued in Chinese Patent Application No. 200810109062.0 (with English-language translation thereof).

* cited by examiner

COIL CONNECTING STRUCTURE, COIL CONNECTING METHOD, SET OF CONDUCTORS, AND ELECTRIC MOTOR

BACKGROUND OF THE INVENTION

1. Field of the Invention

The present invention relates to an electric motor, and more particularly to an electric motor in which an electrical connection between lead terminals of coils such as stator windings and a power input member (connector) to which an electric power is inputted is facilitated for easy assembly, a connecting structure in the electric motor, a connecting method and a set of conductors for use in the electric motor.

2. Description of Related Art

In an electric motor having a structure that connects ends of coils wound around a stator to a power input member (connector) or a terminal block, conventionally, as shown in FIG. 8, the ends 2 of the coils are pulled out from a connector mounting 1, stripped, and soldered directly to the connector 3.

In addition, a technique is known in which, as shown in FIG. 9, conductors 6 fixedly mounted on an insulator 5 are mounted on the power input unit (connector) 4 in advance, and the conductors 6 and the coil lead terminals 8 are passed through annular members 7 and connected by conductive caulking (JP 2004-343831A). Moreover, a technique for facilitating the connection between the power input member (connector) and the conductors is proposed in JP 2006-31986A, and a technique relating to a conductive caulking method is proposed in JP 2002-343528A.

However, the invention described in JP 2004-343831A has a drawback in the man-hours required to pass the conductors and the lead terminals of the coils through the terminals and in the need to fixedly mount the terminals at predetermined positions in order to set the whole assembly on a conductive caulking machine. In addition, the work man-hours required to place a housing over the connector unit once it has been installed also pose a problem. Moreover, in a case in which the conductor part is fixedly mounted on the insulator, the number of parts as well as the work man-hours increase and the structure becomes complicated, which increases the cost of the motor.

SUMMARY OF THE INVENTION

The present invention provides an electric motor in which an electrical connection between lead terminals of coils such as stator windings and a power input member (connector) to which an electric power is inputted is facilitated for easy assembly, a connecting structure in the electric motor, a connecting method and a set of conductors for use in the electric motor.

A coil connecting structure of the present invention is for supplying an electric power to coils of an electric motor. The coil connecting structure comprises: a power input member to which the electric power is inputted; and a set of conductors each having one end connected to the power input member and the other end connected to one of lead terminals of the coils, the other end being formed into a terminal-shaped portion into which one of the lead terminals of the coils is fitted to be temporarily retained, wherein the lead terminals of the coils temporarily retained are fixed respectively to the terminal-shaped portions by conductive caulking.

The terminal-shaped portion may be U-shaped, arc-shaped, or have a constricted part.

The terminal-shaped portion may extend in a direction within an angle formed between end faces of the coils and a wall of a housing of the electric motor such that a distal end of a conductive caulking machine does not interfere with the end faces of the coils and the wall of the housing when the lead terminals of the coils are fixed to the terminal-shaped portions by conductive caulking.

The coil connecting structure may further comprise a cover member for simultaneously covering a plurality of terminal-shaped portions of the set of conductors.

The coil connecting structure may further comprise an insulator molded to be integrated with the set of conductors.

A coil connecting method for an electric motor of the present invention comprises the steps of: mounting a power input member to which an electric power is inputted, a set of conductors and an insulator on a housing, each of the conductors having one end connected to the power input member and the other end formed into a terminal-shaped portion into which one of lead terminals of the coils is fitted to be temporarily retained; mounting the housing with the power input member, the set of conductors and the insulator on a stator; inserting the lead terminals of the coils respectively into the terminal-shaped portions of the conductor to be temporarily retained; and fixing the lead terminals of the coils temporarily retained respectively to the terminal-shaped portions of the conductors by conductive caulking.

A set of conductors of the present invention is for electrically connecting a power input member to which an electric power is inputted and lead terminals of coils of an electric motor, and each of the conductors has a terminal-shaped portion that temporarily retain one of the lead terminals of the coils at one end of each of the conductors.

An electric motor of the present invention comprises: a power input member to which an electric power is inputted; coils having lead terminals; and a set of conductors for electrically connecting the power input member and the lead terminals of the coils, one end of each of the conductors being formed into a terminal-shaped portion for temporarily retaining one of the lead terminals of the coils, wherein the lead terminals of the coils are fixed respectively to the terminal-shaped portions of the conductors by conductive caulking.

The conductors that are to be fixedly mounted on the connector or the terminal block are made of a conductively caulkable material such as copper. A tip of each conductor is formed into the shape of a terminal as a terminal-shaped portion and the lead terminal of the coils are set in the terminal-shaped portion. Accordingly, there is no need to provide a new terminal to carry out conductive caulking, and thus the whole assembly can be set easily on a conductive caulking machine.

In addition, by providing an insertion part for the lead terminal of the coils in the terminal-shaped portion, the lead terminal of the coils can be set easily on the terminal-shaped portion without having to pass the lead terminal of the coils in a direction that passes through an annular part or a hole. Moreover, by forming a constricted part in the terminal-shaped portion by constricting the end of the terminal-shaped portion, the lead terminals of the coil are prevented from coming out of the terminal-shaped portion 10 easily, reducing the occurrence of manufacturing defects in later stages like conductive caulking to be reduced.

Setting the angle at which the terminal-shaped portion extends to a predetermined angle between horizontal and vertical with respect to end faces of the coils makes it possible to avoid the problems of the terminal-shaped portion coming too close to the end faces of the coils when horizontal and hindering conductive caulking as well difficulty with attaching the lead terminal of the coils when vertical.

Using a terminal cover that covers a plurality of terminals simultaneously after conductive caulking has been carried out eliminates the burden of protecting each terminal individually. Moreover, integrating the conductors that are fixedly mounted on the connector with the insulator as a single unit enables production costs to be reduced. By installing the connector, the conductors, and the insulator in the housing, simply by mounting the housing on the stator enables the-shaped portion of the conductors to be attached to the lead terminal of the coils.

DETAILED DESCRIPTION

Figure 1A:
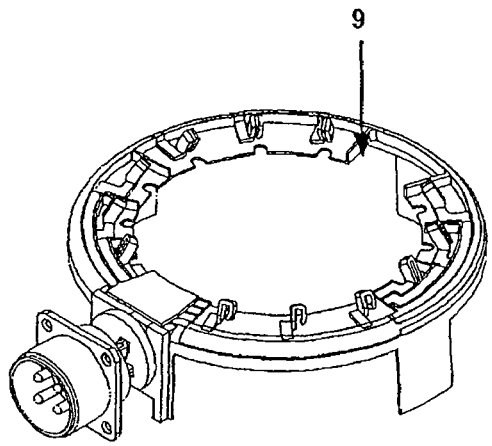
FIGS. 1a-1c are diagrams showing examples of connecting structures in which one end of the conductor that is an embodiment of the present invention is in the shape of a terminal.
Figure 1B:
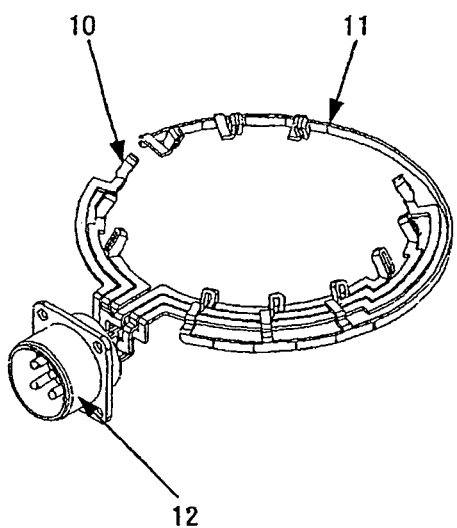
Figure 1C:
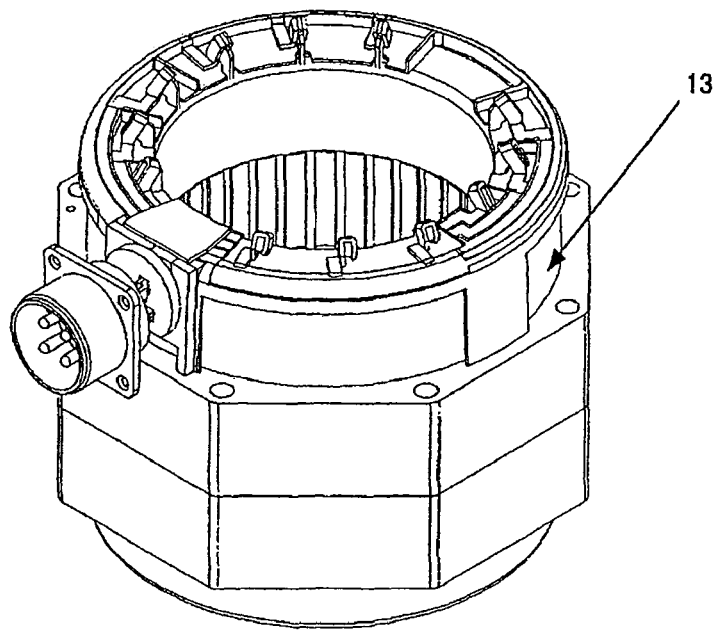

FIGS. 1a-1c show examples of coil connecting structures that are one embodiment of the present invention. Conductors 11 are formed of a conductively caulkable material such as copper. One end of each conductor 11 is formed into the shape of a terminal as a terminal-shaped portion 10, and the other end is mounted on a power input member (connector) 12. The conductors 11 are formed so as to conform to the shape of coil ends of a stator coil 13 and maintain that shape, and therefore the conductors 11 do not protrude outside the electric motor.

Figure 2A:
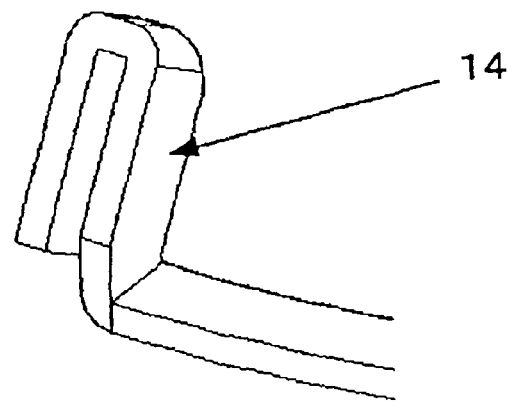
FIGS. 2a-2c are diagrams showing examples of terminal-shaped portions formed on the conductor.
Figure 2B:
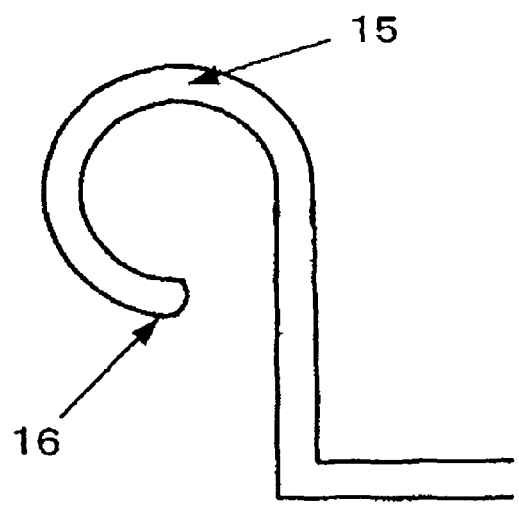
Figure 2C:
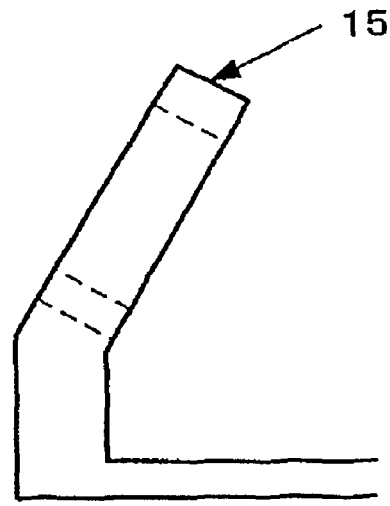

FIGS. 2a-2c show expanded views of the terminal-shaped portion 10 formed in one end of the conductors 11. The shape of the terminal-shaped portion 10 need only be such as to accommodate lead terminals of the coils and enable them to be temporarily retained in place, and FIG. 2a shows the terminal-shaped portion 10 as a U-shaped terminal 14. FIG. 2b shows the terminal-shaped portion 10 as an arc-shaped terminal 15. FIG. 2b shows a front view of the arc-shaped terminal 15 and FIG. 2c shows a side view of the arc-shaped terminal 15. As shown in FIGS. 2a and 2c, the U-shaped terminal 14 and the arc-shaped terminal 15 are slanted at a predetermined angle with respect to a bottom part of the conductors 11 so that end faces of the coils and they attain a predetermined angle when the conductors 11 are assembled in the electric motor. A gap sufficient to enable lead terminals 19 of the coils to be inserted therein is provided in a tip 16 of the arc-shaped terminal 15.

Figure 3A:
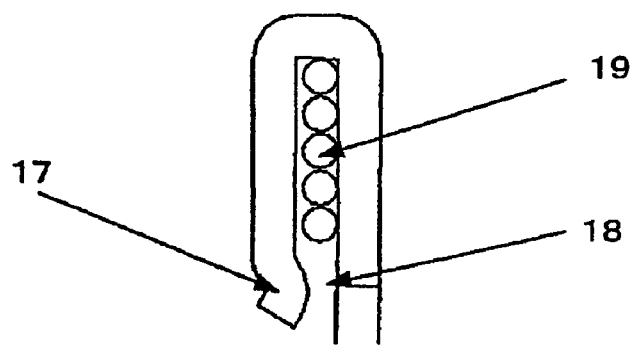
FIGS. 3a-3c are diagrams showing examples in which a bent end part of a U-shaped terminal of the conductor is constricted.
Figure 3B:
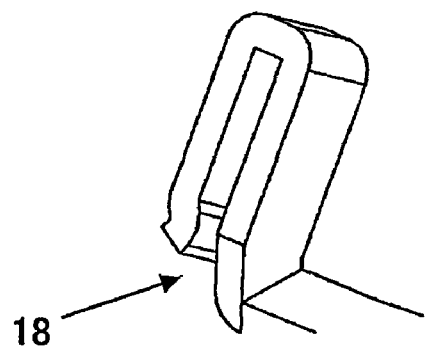
Figure 3C:
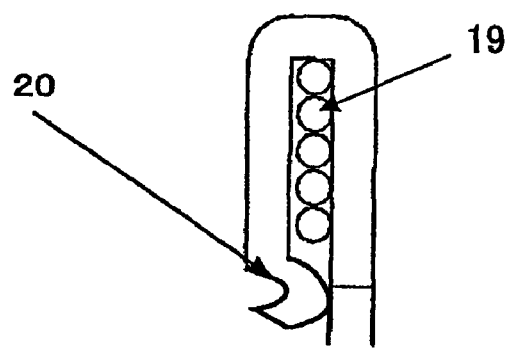

FIGS. 3a-3c show the end of the U-shaped terminal 14 of the conductor 11 shown in FIG. 2a given a constricted part 17 by slightly constricting the end of the U-shaped terminal 14. The constricted part 17 is a portion that reduces an insertion opening 18 into which the lead terminals 19 of the coils are inserted to something smaller than the diameter of the lead terminals 19. The lead terminals 19 of the coils do not come out in the direction of the insertion opening 18, but the terminal-shaped portion 10 has elasticity like a cantilever spring and therefore when the lead terminals 19 of the coils are inserted the insertion opening spreads apart easily. Although the constricted part 17 shown in FIGS. 3a and 3b form the coil insertion opening 18, as noted above the terminal-shaped portion 10 is elastic, and therefore it is also possible to temporarily fix in place the lead terminals 19 of the coils by using the lead terminals 19 of the coils to spread open the constricted part 17 without providing a gap for the insertion of the lead terminals 19 of the coils as shown with the U-shaped terminal 20 shown in FIG. 3c, in which the constricted part contacts the opposing terminal part.

Figure 4:
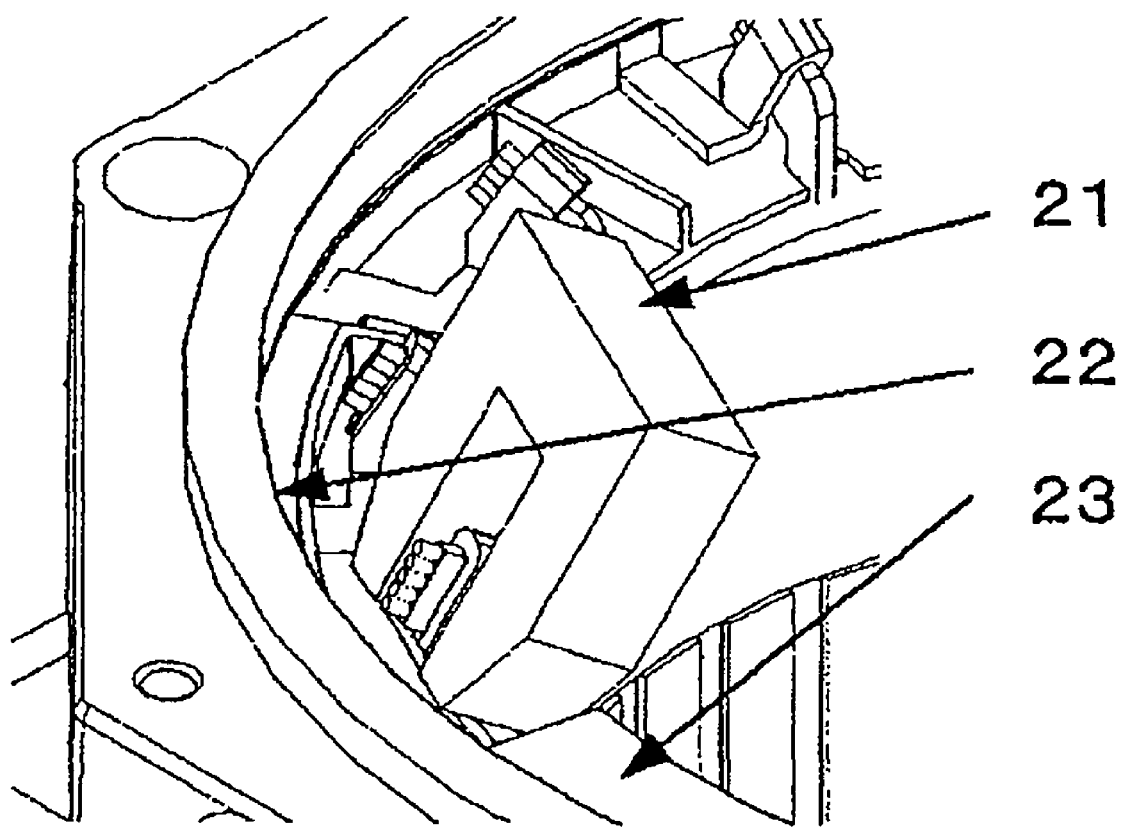
FIG. 4 is a diagram showing an example in which a direction in which the terminal of the conductor extends is a direction in which conductive caulking can be performed.

FIG. 4 shows an example in which a direction in which the terminal-shaped portion 10 extends when the conductor 11 is assembled in the electric motor is slanted at a predetermined angle with respect to end faces of the coils (a horizontal surface of upper ends the coils) and in which conductive caulking can be performed. Thus slanting the conductor 11 at a predetermined angle facilitates the work of attaching the lead terminals 19 of the coils to the terminal-shaped portion 10. The predetermined angle may be selected from a range through which a tip portion of a conductive caulking machine 21 does not interfere spatially with a housing vertical wall 22 and a horizontal surface 23 of the end faces of the coils.

Figure 5A:
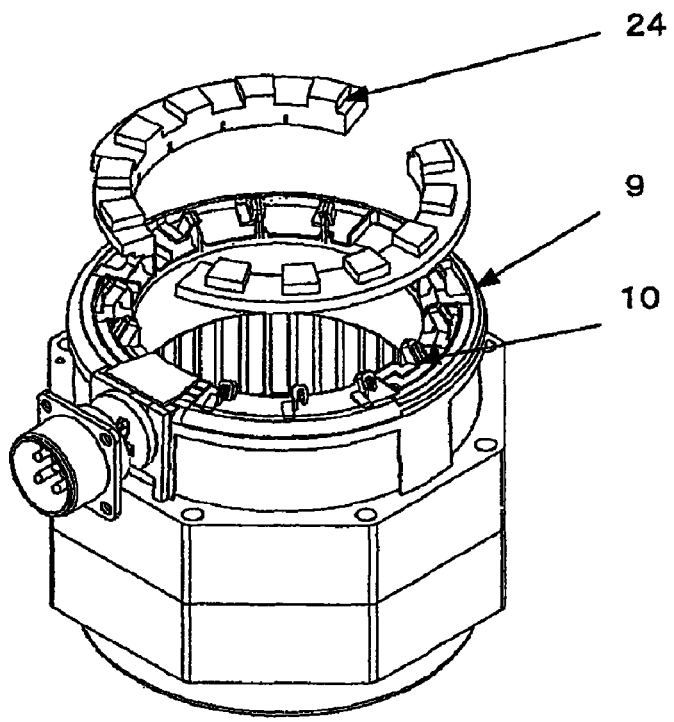
FIGS. 5a and 5b are diagrams showing an example in which multiple conductively caulked terminals are insulated and covered.
Figure 5B:
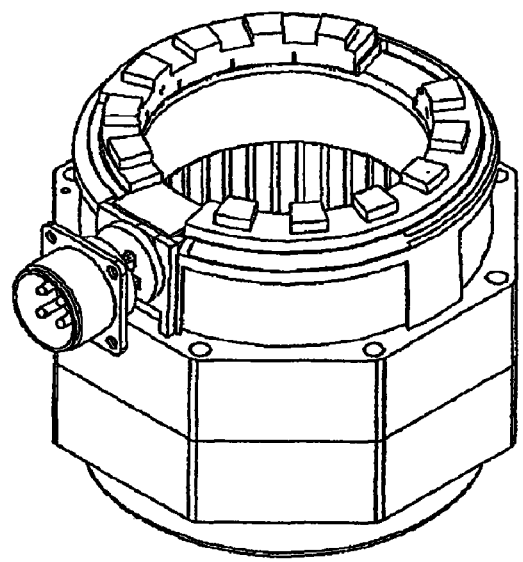

FIGS. 5a and 5b are diagrams showing an example in which a cover 24 that covers a plurality of terminals simultaneously is provided on the conductively caulked terminal-shaped portions 10, thus insulating the terminal-shaped portions 10. By using a terminal cover 24 to cover simultaneously a plurality of terminals after the terminals have been conductively caulked, the burden of protecting each terminal individually can be eliminated.

Figure 6A:
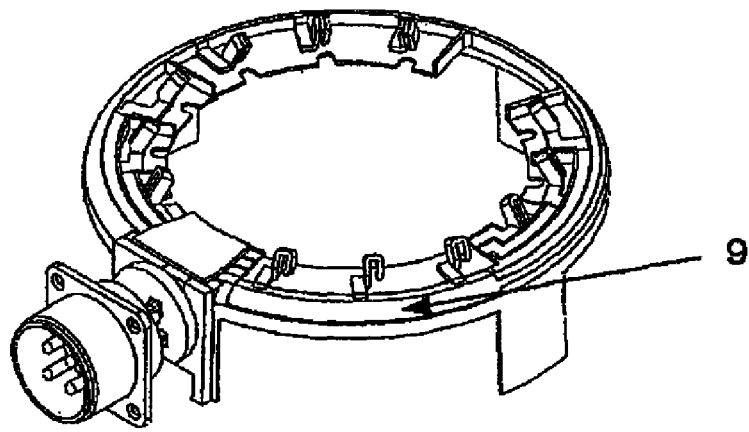
FIGS. 6a and 6b are diagrams showing examples in which the conductor and the insulator are formed as a single unit.
Figure 6B:
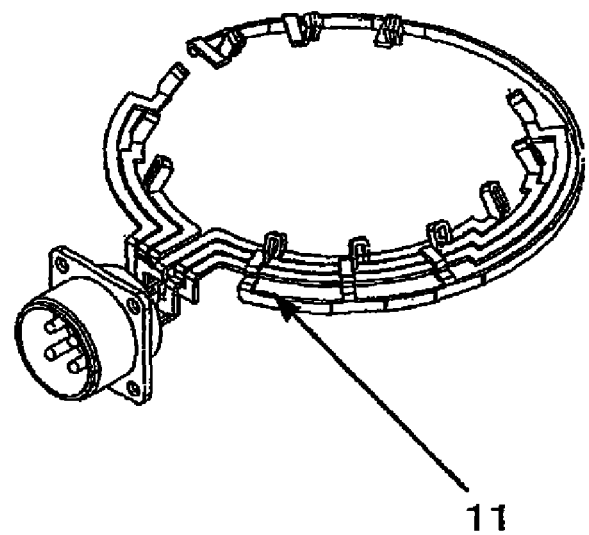

FIGS. 6a and 6b are diagrams showing examples in which the conductor 11 and the insulator 9 are formed as a single unit, so as to conform to the shape of the end faces of the coils and to maintain that shape. Forming the conductor 11 and the insulator 9 as a single unit facilitates installation in the housing and enables production costs to be reduced.

Figure 7A:
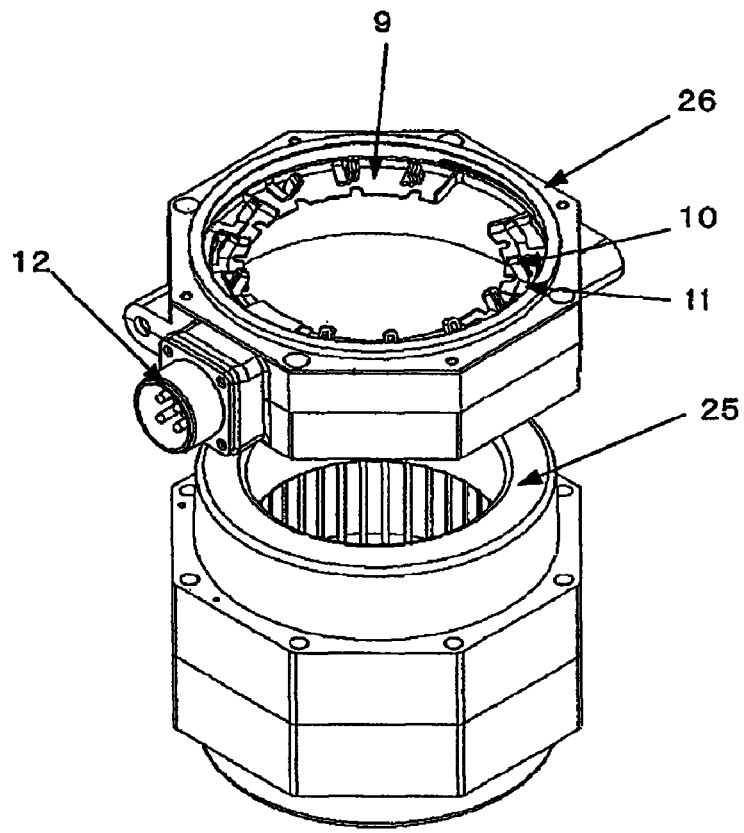
FIGS. 7a and 7b are diagrams showing a connecting method that is one embodiment of the present invention.
Figure 7B:
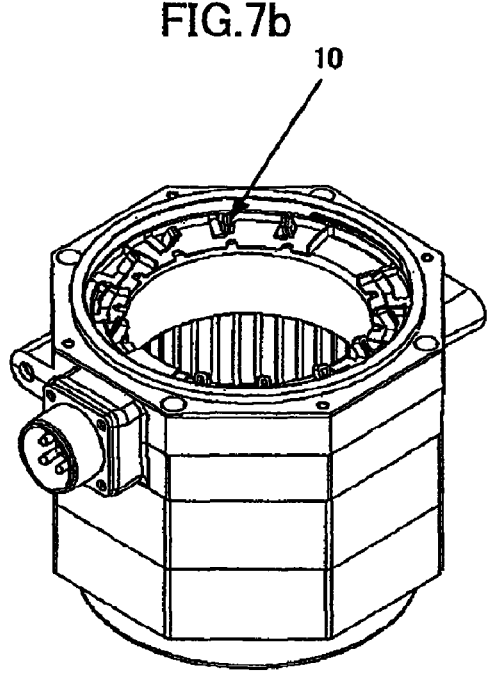
Figure 8:
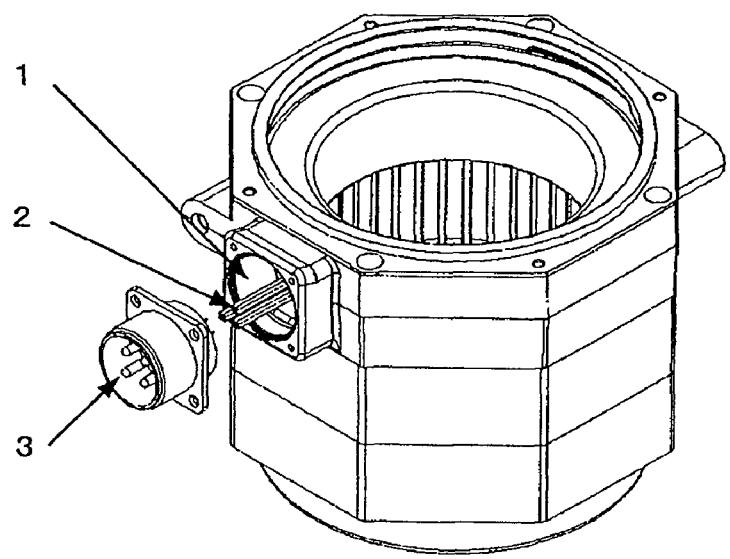
FIG. 8 is a diagram showing an example of the conventional art in which terminals of the coils are stripped and soldered directly to the connector.
Figure 9:
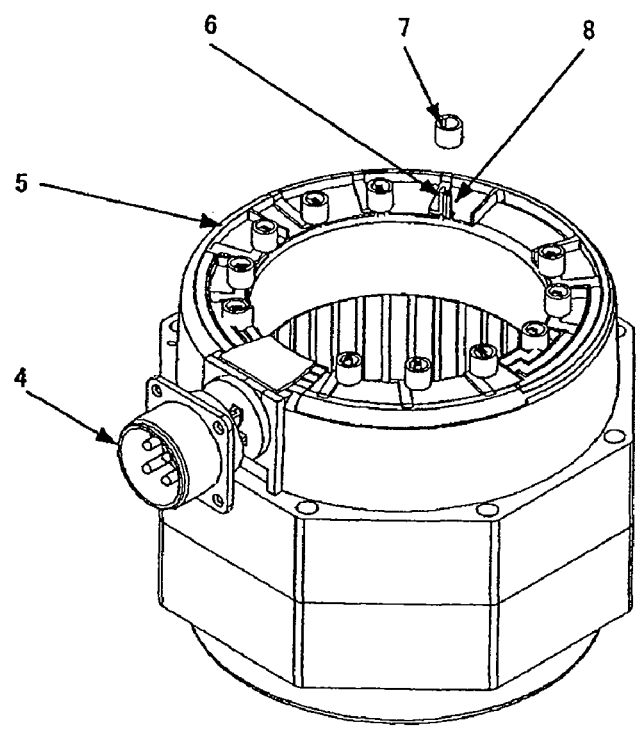
FIG. 9 is a diagram showing an example of the conventional art in which an end of the conductor and a lead terminal of the coils are passed through an annular member to be connected.

FIGS. 7a and 7b show the insulator 9, the power input member (connector) 12, and the conductor 11 installed in a housing 26 and in the process of being attached to coils (stator windings) 25. Subsequently, either manually or by a robot or other automated machinery, the lead terminals 19 of the coils can be inserted in the terminal-shaped portion 10, thus improving assembly efficiency.

What is claimed is:

1. A coil connecting structure for supplying an electric power to coils of an electric motor, comprising:
   a power input member to which the electric power is inputted; and
   a set of conductors each having one end connected to said power input member and the other end connected to one of lead terminals of the coils, said other end being formed into a terminal-shaped portion into which one of the lead terminals of the coils is fitted to be temporarily retained, wherein the lead terminals of the coils temporarily retained are fixed respectively to the terminal-shaped portions by conductive caulking and wherein the conductor is assembled in the electric motor such that the terminal-shaped portion extends at a slant within a space defined by a housing vertical wall and a horizontal surface of end faces of the coils of the electric motor, not parallel with the vertical wall or the horizontal surface.

2. A coil connecting structure according to claim 1, wherein the terminal-shaped portion is U-shaped.

3. A coil connecting structure according to claim 1, wherein the terminal-shaped portion is arc-shaped.

4. A coil connecting structure according to claim 1, wherein the terminal-shaped portion has a constricted part.

5. A coil connecting structure according to claim 1, further comprising a cover member for simultaneously covering a plurality of terminal-shaped portions of the set of conductors.

6. A coil connecting structure according to claim 1, further comprising an insulator molded to be integrated with the set of conductors.

* * * * *